(12) United States Patent
Ogawa

(10) Patent No.: US 7,056,480 B2
(45) Date of Patent: Jun. 6, 2006

(54) FUEL REFORMING SYSTEM

(75) Inventor: Hiroshi Ogawa, Yokohama (JP)

(73) Assignee: Nissan Motor Co., Ltd., Kanagawa (JP)

(*) Notice: Subject to any disclaimer, the term of this patent is extended or adjusted under 35 U.S.C. 154(b) by 645 days.

(21) Appl. No.: 10/332,278

(22) PCT Filed: Aug. 21, 2002

(86) PCT No.: PCT/JP02/08405

§ 371 (c)(1),
(2), (4) Date: Jan. 7, 2003

(87) PCT Pub. No.: WO03/027006

PCT Pub. Date: Apr. 3, 2003

(65) Prior Publication Data

US 2004/0101720 A1 May 27, 2004

(30) Foreign Application Priority Data

Sep. 19, 2001 (JP) .............................. 2001-284350

(51) Int. Cl.
B01J 8/00 (2006.01)
B01J 8/02 (2006.01)
G05D 7/00 (2006.01)
G05D 23/00 (2006.01)

(52) U.S. Cl. ...................... 422/197; 422/108; 422/109; 422/110; 422/111; 422/112; 422/113; 422/114; 422/115; 422/116; 422/188; 422/181; 422/182; 422/82.12; 422/198; 422/305; 423/66; 48/191

(58) Field of Classification Search ................ 422/108, 422/109, 110, 111, 112, 113, 114, 115, 116, 422/197; 423/66; 48/191
See application file for complete search history.

(56) References Cited

U.S. PATENT DOCUMENTS 5,897,970 A 4/1999 Isomura et al.
6,231,831 B1 * 5/2001 Autenrieth et al. ...... 423/648.1

FOREIGN PATENT DOCUMENTS

DE 197 57 506 A1 7/1999
DE 199 020 926 A1 8/2000
EP 0 924 161 A2 6/1999
JP 2001-135336 5/2001

* cited by examiner

Primary Examiner—Alexa D. Neckel
Assistant Examiner—Kaity V. Handal
(74) Attorney, Agent, or Firm—McDermott Will & Emery LLP

(57) ABSTRACT

A fuel reforming system comprises a reforming catalyst section (4) performing reformate reactions on supplied fuel gas, a membrane hydrogen separator (5) extracting hydrogen from the reformate gas, a supply device (8–14) supplying combustion gas for heating the membrane reactor (2), a sensor (16) for detecting the temperature of the membrane hydrogen separator (5) and a controller. The supply device supplies combustion gas to the membrane reactor (2) before the reforming catalyst section starts reformate reactions during startup of the membrane reactor (2). Furthermore the supply device stops supply of combustion gas to the membrane reactor (2) when the temperature of the membrane hydrogen separator (5) is greater than or equal to a target temperature. Thereafter the fuel supply device supplies fuel to the fuel reforming catalyst section (4). In this manner, hydrogen embrittlement in the membrane hydrogen separator can be avoided.

13 Claims, 5 Drawing Sheets

FUEL REFORMING SYSTEM

This application is a 371 of PCT/02/08405 filed Aug. 8, 2002.

FIELD OF THE INVENTION

This invention relates to a fuel-reforming system.

BACKGROUND OF THE INVENTION

A type of fuel reforming system known from the prior-art comprises with a membrane-type hydrogen generator which separates hydrogen from a reformate gas using a hydrogen permeable membrane (membrane hydrogen separator). Tokkai 2001-135336 published by the Japanese Patent Office in 2001 discloses a fuel reforming system using this type of membrane-type hydrogen generator.

The strength of the hydrogen permeable membrane, and in particular, the strength of a metallic hydrogen permeable membrane is reduced during permeation of hydrogen. This phenomenon is known as hydrogen embrittlement. Consequently the fuel reforming system must supply hydrogen to the hydrogen permeable membrane taking such hydrogen embrittlement into account. Hydrogen embrittlement tends to occur at low temperatures in a metal membrane hydrogen separator such as a palladium membrane or a palladium alloy membrane.

SUMMARY OF THE INVENTION

However the above type of prior-art fuel reforming system does not constitute a sufficient solution to the problem of hydrogen embrittlement. In particular, when starting the fuel reforming system, hydrogen produced by the reformer is supplied to the membrane hydrogen separator when the temperature of the membrane hydrogen separator is at a low level. Thus when hydrogen is supplied to the membrane hydrogen separator at a low temperature, hydrogen embrittlement results in the membrane hydrogen separator and this reduces the permeability of the membrane hydrogen separator.

It is therefore an object of this invention to provide a fuel reforming system which can avoid hydrogen embrittlement at low temperatures.

In order to achieve above object, this invention provides a fuel reforming system comprising a membrane reactor having a reforming catalyst section for reforming a supplied fuel gas to a reformate gas, a membrane hydrogen separator for separating hydrogen from the reformate gas, a hydrogen passage for transferring hydrogen separated by the membrane hydrogen separator to a fuel cell, and a combustion catalyst section for heating the reforming catalyst section; a first supply device for supplying combustion gas to the membrane reactor, the first supply device having a combustor for producing the combustion gas; a second supply device for supplying the fuel gas to the reforming catalyst section; a sensor for detecting a temperature of the membrane hydrogen separator; and a controller.

The controller functions to determine whether or not the temperature of the membrane hydrogen separator is greater than or equal to a target temperature before the reforming catalyst section starts reformate reactions on the fuel gas; command the first supply device to supply the combustion gas to at least one of the reforming catalyst section and hydrogen passage when the temperature of the membrane hydrogen separator is smaller than the target temperature; and command the first supply device to stop the supply of the combustion gas and command the second supply device to start supply of the fuel gas to the membrane reactor when the temperature of the reforming catalyst section of the membrane hydrogen separator reaches the target temperature.

The details as well as other features and advantages of this invention are set forth in the remainder of the specification and are shown in the accompanying drawings.

DESCRIPTION OF THE PREFERRED EMBODIMENTS

Figure 1:
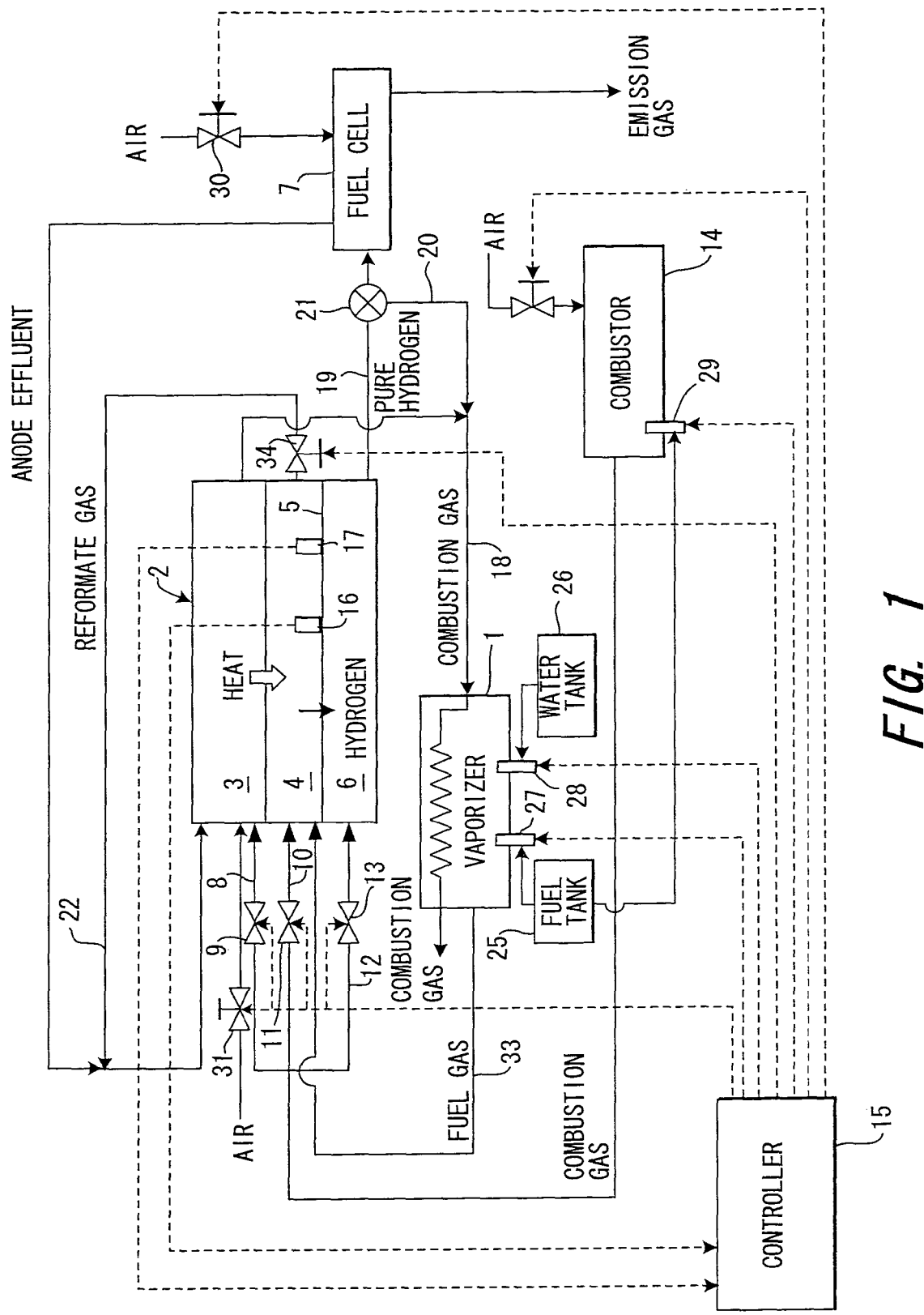
FIG. 1 shows a fuel reforming system according to a first embodiment of this invention.

FIG. 1 is a schematic diagram of a fuel reforming system according to a first embodiment.

A fuel reforming system according to this embodiment comprises a vaporizer 1 for generating a fuel gas, a membrane reactor 2 for producing pure hydrogen, that is to say, a membrane-type hydrogen generator, a fuel cell 7 for generating power by electrochemical reactions, and a combustor 14 for producing heat to warm-up the system.

The membrane reactor 2 comprises a combustion catalyst section 3 for supplying heat required for the reforming reactions, a reforming catalyst section 4 which performs reforming reactions, and a hydrogen passage 6 allowing hydrogen separated by permeation through the membrane hydrogen separator 5 from the reforming catalyst section 4 to be discharged out of the membrane reactor 2.

The combustion catalyst section 3 comprises a catalyst such as platinum (Pt), palladium (Pd), or rhodium (Rh) which burns hydrogen in the anode effluent discharged from the fuel cell 7. The reforming catalyst section 4 comprises a catalyst such as nickel (Ni), copper-zinc (Cu—Zn), or ruthenium (Ru). The membrane hydrogen separator 5 separates the reforming catalyst section 4 and the hydrogen supply passage 6 in a membrane reactor 2. The membrane hydrogen separator 5 is made of a metal, such as palladium (Pd), a palladium alloy, vanadium (V), tantalum (Ta), or niobium (Nb). These metals have the property of storing hydrogen therein, resulting in permeability to hydrogen, and are subject to hydrogen embrittlement at low temperatures rather than at high temperatures. A temperature sensor 16 and a pressure sensor 17 are provided on the membrane hydrogen separator 5.

The vaporizer 1 is a heat exchanger and is supplied with water and a liquid hydrocarbon fuel as the raw materials in order to produce a fuel gas. In the vaporizer 1, heat from the combustion gas supplied from the combustion catalyst section 3 or the hydrogen passage 6 produces a fuel gas comprising a gaseous mixture of steam and hydrocarbon fuel from water and liquid hydrocarbon fuel by heat exchange. Fuel gas is supplied to the reforming catalyst section 4 of the membrane reactor 2 via a fuel gas passage 33. Reformate reactions are performed on the fuel gas by heat exchange between the combustion catalyst section 3 and the reforming catalyst section 4. The membrane hydrogen separator 5 allows selective permeation of hydrogen in the resulting reformate gas. Hydrogen is supplied to a fuel cell 7 through the hydrogen passage 6. The fuel cell 7 generates power by electrochemical reactions. Excess hydrogen, namely anode effluent, is discharged from the fuel cell 7 and supplied to the combustion catalyst section 3 in the membrane reactor 2 to burn excess hydrogen with air. The air is supplied from an air compressor (not shown) and the air amount is controlled by a valve 31 operated by a controller 15.

The reforming catalyst section 4 of the membrane reactor 2 performs reformate reactions on the hydrocarbon fuel. The hydrocarbon fuel may comprise methanol, gasoline or natural gas. Reformate reactions will be described below taking methanol reformate reactions as an example. When methanol undergoes steam reforming reactions, methanol decomposition reactions as shown in Equation (1) and CO transformation reactions as shown in Equation (2) are simultaneously promoted. The overall reaction is shown in Equation (3). The reaction as shown in Equation (2) is termed a shift reaction.

$$CH_3OH \rightarrow CO+2H_2-90.0 \text{ (kJ/mol)} \quad (1)$$

$$CO+H_2O \rightarrow CO_2+H_2+40.5 \text{ (kJ/mol)} \quad (2)$$

$$CH_3OH+H_2O \rightarrow CO_2+3H_2-49.5 \text{ (kJ/Mol)} \quad (3)$$

The fuel cell 7 comprises a pair of electrodes sandwiching an electrolytic layer. One electrode, which is termed an anode, is supplied with a gas containing hydrogen. The other electrode, which is termed a cathode, is supplied with a gas containing oxygen. An electromotive force is produced by electrochemical reactions occurring at both electrodes.

The electrochemical reactions occurring in the fuel cell 7 are shown below.

$$H_2 \rightarrow 2H^+ + 2e^- \quad (4)$$

$$(\tfrac{1}{2}) O_2 + 2H^+ + 2e^- \rightarrow H_2O \quad (5)$$

$$H_2 + (\tfrac{1}{2}) O_2 \rightarrow H_2O \quad (6)$$

Equation (4) represents reactions occurring at the anode and Equation (5) represents reactions occurring at the cathode. The overall reaction occurring in the fuel cell 7 is shown in Equation (6).

A fuel cell 7 according to this embodiment is a proton exchange membrane fuel cell (PEMFC) with electrodes provided with a catalyst comprising platinum. If a large concentration of carbon monoxide (CO) is contained in the reformate gas supplied to the fuel cell, the function of the catalyst in the anode is adversely affected as a result of adsorption of CO by the platinum catalyst. Consequently the membrane hydrogen separator 5 reduces the CO concentration in the reformate gas supplied to the fuel cell 7 to a level of several tens ppm.

Generally at startup of the fuel reforming system, the temperature of the membrane hydrogen separator 5 is low. If hydrogen is produced by reformate reactions in the reforming catalyst section 4 under these conditions, embrittlement in the membrane hydrogen separator 5 may result from supplying hydrogen to the membrane hydrogen separator 5 at a low temperature. The hydrogen embrittlement reduces the permeation performance of the membrane hydrogen separator 5.

The fuel reforming system according to this invention rapidly increases the temperature of the membrane hydrogen separator 5 to a target temperature when starting the fuel reforming system in order to prevent hydrogen embrittlement of the membrane hydrogen separator 5. A controller 15 sets the target temperature on the basis of the pressure applied to the membrane hydrogen separator 5, i.e. the pressure on the reforming catalyst section 4. Below the target temperature, the membrane hydrogen separator 5 is subject to hydrogen embrittlement when hydrogen is produced by reformate reactions in the reforming catalyst section 4. The fuel reforming system supplies combustion gas produced by the combustor 14 respectively to the combustion catalyst section 3, reforming catalyst section 4 and the hydrogen passage 6 of the membrane reactor 2. This fuel reforming system is provided with a main passage supplying combustion gas to the membrane reactor 2 from the combustor 14. The main passage branches into triple passages along the main passage. The triple passages comprise a first combustion gas passage 10 to the reforming catalyst section 4 provided with a first flow control valve 11, a second combustion gas passage 12 to the hydrogen passage 6 provided with a second flow control valve 13, and a third combustion gas passage 8 to the combustion catalyst section 3 provided with a third flow control valve 9.

The fuel reforming system is provided with a combustion gas discharge passage 18 for supplying exhaust gas from the combustion catalyst section 3 to the vaporizer 1 in order to supply heat required for vaporizing water and fuel. The fuel reforming system is further provided with a reformate gas passage 22 which supplies exhaust gas from the reforming catalyst section 4 to the combustion catalyst section 3. The fuel reforming system is further provided with a combustion gas discharge passage 20 which branches via a switching valve 21 along the hydrogen supply passage 19 for supplying hydrogen to the fuel cell from the hydrogen passage 6. The combustion gas discharge passage 20 is a discharge passage for the combustion gas used to increase the temperature of the membrane hydrogen separator 5 at startup.

Signals from a temperature sensor 16, signals from a pressure sensor 17 and system startup command signals from the outside of the system are inputted into the controller 15. The controller 15 controls the closing/opening of the flow control valves 9, 11, 13 based on these signals.

The controller 15 comprises a microcomputer provided with a central processing unit (CPU), a read only memory (ROM), a random access memory (RAM) and an input/output interface (I/O interface). The controller 15 may comprise a plurality of microcomputers.

After the start of the fuel reforming system and before the supply of fuel gas to the reforming catalyst section 4, the controller 15 opens the flow control valves 9, 11, 13 so that the combustion gas produced by the combustor 14 is supplied to the hydrogen passage 6, the reforming catalyst section 4 and the combustion catalyst section 3 of the membrane reactor 2 through a combustion gas passage 8 to the combustion catalyst section 3, a combustion gas passage 10 to the reforming catalyst section 4 and a combustion gas passage 12 to the hydrogen passage 6.

Further, the controller 15 controls the pressure on the reforming catalyst section 4 by using a pressure control valve 34 disposed on the reformate gas passage 22 such that the pressure on the reforming catalyst section 4 is maintained to a fixed value throughout startup operation and normal operation of the reforming system. Therefore, on the membrane hydrogen separator 5, the pressure of the combustion gas is substantially equal to the pressure of the reformate gas.

Combustion gas supplied in this embodiment comprises a lean combustion gas not containing fuel in order to substantially avoid production of hydrogen by the reforming catalyst section 4. The supply of a lean combustion gas does not cause hydrogen embrittlement in the membrane hydrogen separator 5 although the supply of a fuel gas may cause hydrogen embrittlement.

The temperature of the membrane hydrogen separator 5 is rapidly increased to a target temperature by supplying combustion gas in the above manner and thus it is possible to avoid hydrogen embrittlement in the membrane hydrogen separator 5 when the fuel gas is supplied to the reforming catalyst section 4.

The controller 15 further controls an injection valve 27 for the vaporizer 1 which introduces fuel from a fuel tank 25 into the vaporizer 1, an injection valve 28 for the vaporizer 1 which introduces water from a water tank 26 into the vaporizer 1 and an injection valve 29 for the combustor 15 which introduces fuel into the combustor 14. The controller 15 also controls a valve 30 which supplies air from an air compressor (not shown) to the fuel cell 7.

The controller 15 monitors the pressure applied to the membrane hydrogen separator 5 and the temperature of the membrane hydrogen separator 5 using the temperature sensor 16 and the pressure sensor 17. In other words, the controller 15 monitors the pressure on the reforming catalyst section 4. When the temperature of the membrane hydrogen separator 5 reaches a target temperature which depends on the pressure, the controller 15 controls the opening of the flow control valves 9, 11 13 to take a value of zero in order to stop supply of combustion gas to the membrane reactor 2. Immediately after the target temperature is reached, the vaporizer 1 produces fuel gas by a supply of water and fuel gas and supplies the fuel gas to the reforming catalyst section 4 in order to commence reformate reactions.

Figure 2:
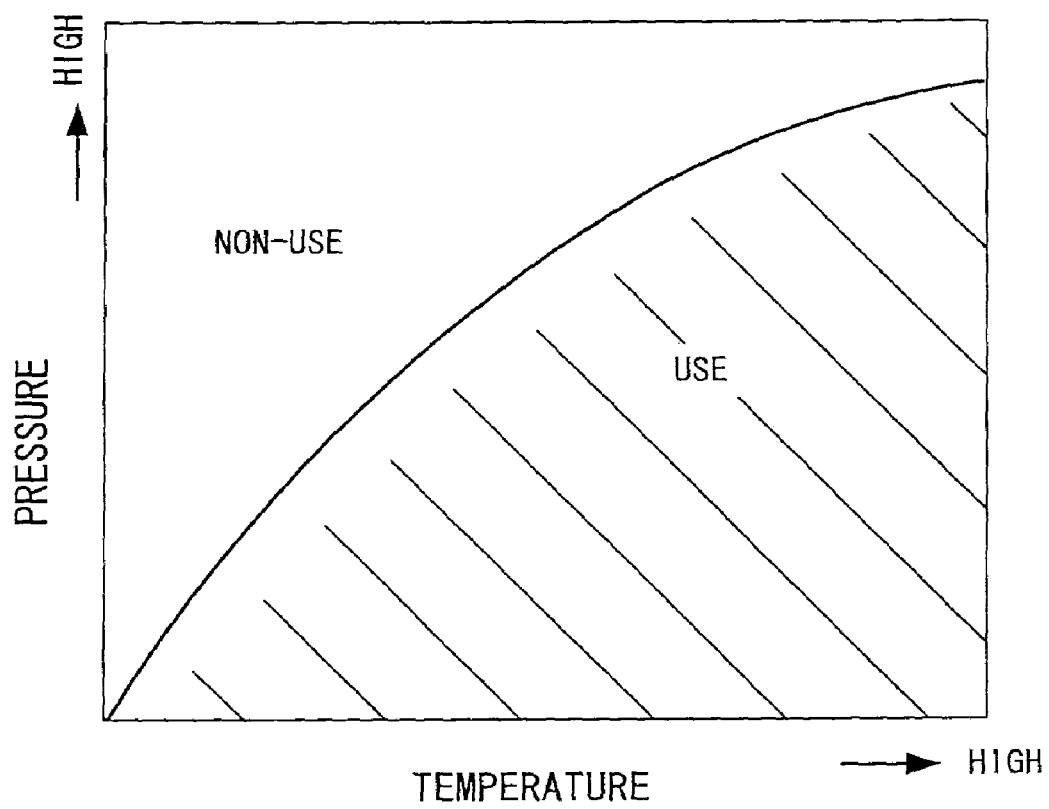
FIG. 2 shows a map of the relationship between the pressure applied to the membrane hydrogen separator and the target temperature for the membrane hydrogen separator.

In order to avoid hydrogen embrittlement of the membrane hydrogen separator 5, reformate reactions are not performed until the temperature of the membrane hydrogen separator 5 reaches a target temperature. Hydrogen embrittlement in the membrane hydrogen separator 5 tends to occur when hydrogen is supplied at a low temperature and under high pressure. FIG. 2 is a map showing the relationship of the pressure applied to the membrane hydrogen separator and the target temperature of the membrane hydrogen separator 5. This map is stored in the ROM of the controller 15.

Referring to FIG. 2, the region in which hydrogen embrittlement is produced resides on the low-temperature side of the target temperature—pressure curve in the figure. Since the membrane hydrogen separator can not be used in this region, it is termed the "non-use region". This map is merely exemplary and corresponds to the use of a palladium membrane hydrogen separator. The target temperature normally increases as the pressure increases for a metal membrane hydrogen separator. Referring again to FIG. 2, when hydrogen is supplied to a membrane hydrogen separator, high pressure results in hydrogen embrittlement even at high temperatures. In the case of a palladium membrane hydrogen separator, hydrogen at partial pressure of 5 atmospheres causes hydrogen embrittlement even at a high temperature of 200° C.

Since the controller 15 controls the pressure control valve 34 downstream of the reforming catalyst section 4 in order to control the pressure of the combustion gas or the pressure of the reformate gas to a fixed value, the controller 15 sets a target temperature for the membrane hydrogen separator 5 in response to the pressure of the combustion gas applied on the membrane hydrogen separator 5 during startup instead of the pressure of the reformate gas to be applied on the membrane hydrogen separator 5.

Though hydrogen embrittlement is directly affected by the partial pressure of hydrogen in the reformate gas rather than the pressure of the reformate gas, the pressure of the combustion gas, which is substantially equal to the pressure of the reformate gas in this embodiment, is used for setting the target temperature. Since the pressure of the reformate gas is greater than the partial pressure of hydrogen in the reformate gas, the target temperature is set to a sufficiently high temperature for preventing hydrogen embrittlement of the membrane hydrogen separator 5 as a result of hydrogen in the reformate gas.

The production of hydrogen by reformate reactions occurs at relatively low temperatures of about 100° C. As a result, reformate reactions are usually started once the temperature measured by the temperature sensor 16 disposed on the membrane hydrogen separator reaches a target temperature. Further, the target temperature for the membrane hydrogen separator 5 at which reformate reactions commence increases as the pressure measured by the pressure sensor 17 disposed on the membrane hydrogen separator 5 increases. In this manner, hydrogen embrittlement can be avoided when reformate reactions commence.

Though the temperature of the membrane hydrogen separator 5 can be effectively increased by supplying combustion gas to the reforming catalyst section 4 and the hydrogen passage 6, the overall temperature of the membrane reactor 2 is increased by the supply of combustion gas to the combustion catalyst section 3 in addition to the reforming catalyst section 4 and the hydrogen passage 6. Consequently the durability of the membrane reactor 2 is improved by suppressing thermal strain resulting from the temperature distribution in the membrane reactor 2.

Furthermore when combustion gas produced in the combustor 14 is supplied to the reforming catalyst section 4, the hydrogen passage 6 and the combustion catalyst section 3 of the membrane reactor 2, the controller 15 controls the flow rate of combustion gas supplied to each section to an equal flow rate, with the first flow control valve 11 for the reforming catalyst section 4, the second flow control valve 13 for the hydrogen passage 6, and the third flow control valve 9 for the combustion catalyst section 3. Pressure loss in the combustion catalyst section 3 and the reforming catalyst section 4 tends to be greater than pressure loss in the hydrogen passage 6, because catalysts are supported in the combustion catalyst section 3 and the reforming catalyst section 4 and a retained body such as a fin is inserted into the catalyst sections 3, 4. Therefore the controller 15 sets the opening of the flow control valves 9, 11 to be greater than the opening of the flow control valve 13 to equalize the flow rate to each section and to optimize the effectiveness of the temperature increase.

The flow rate to each section may be equalized by regulating the cross-sectional area (which is perpendicular to the flow direction) of the combustion gas passages 8, 10, 12. In other words, the cross-sectional area of the first combustion gas passage 10 and the third combustion gas passage 8 may be set to be greater than the cross-sectional area of the second combustion gas passage 12.

Figure 3:
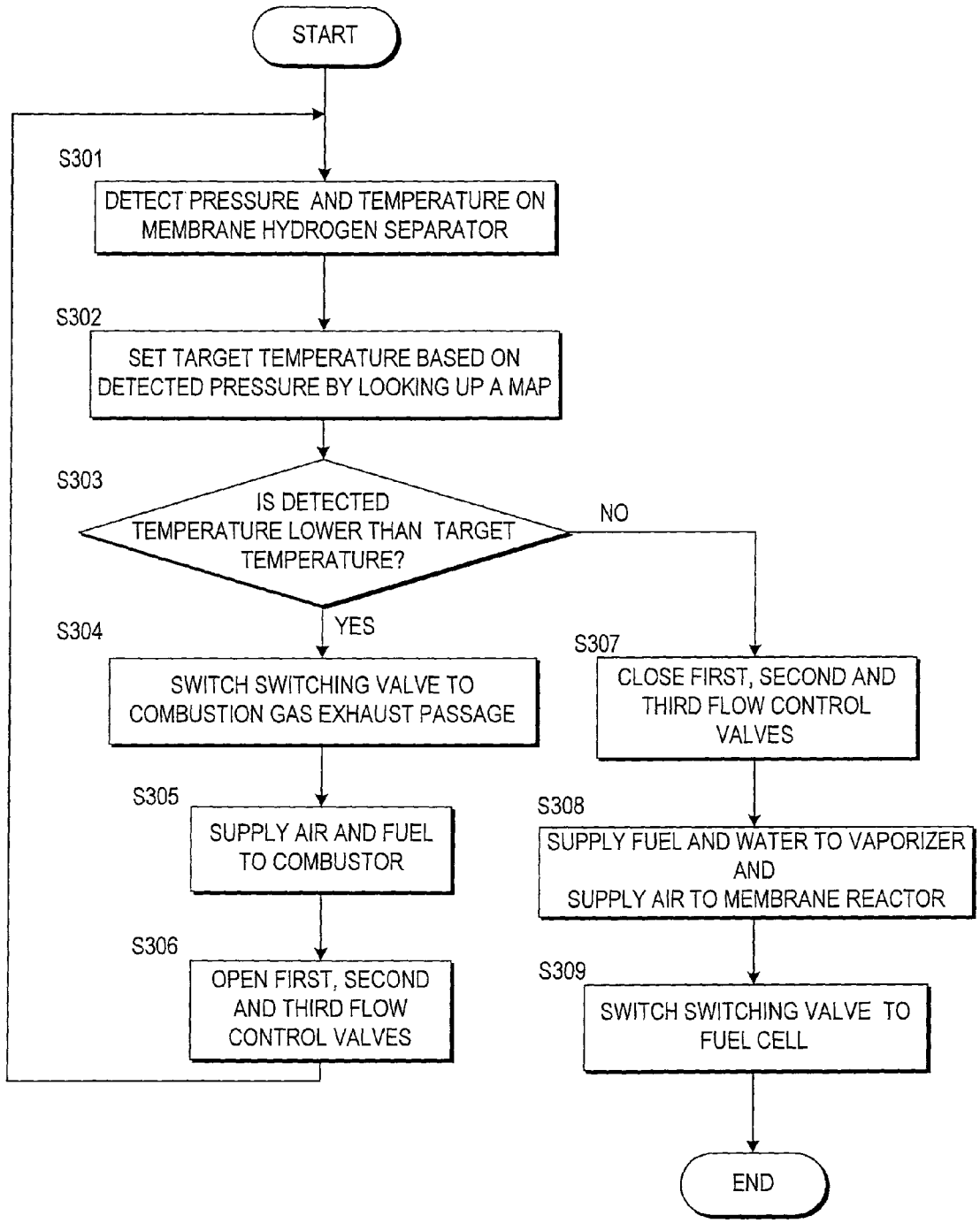
FIG. 3 shows a flowchart describing a control routine according to a first embodiment.

Referring now to the flowchart shown in FIG. 3, an example of a control routine for starting the fuel reforming system will be described. This routine is performed by the controller 15.

Firstly in a step S301, the pressure applied to the membrane hydrogen separator 5 and temperature of the membrane hydrogen separator 5 are read by the controller 15 using a pressure sensor 17 and a temperature sensor 16. Then the routine proceeds to a step S302 wherein a target temperature is set based on the detected pressure by looking up the temperature—pressure map shown in FIG. 2. Thereafter the routine proceeds to a step S303 wherein it is determined whether or not the detected temperature is lower than the target temperature set in the step S302. The processes performed in the step S302 and the step S303 determine whether or not the detected temperature and pressure are in the non-use region in which hydrogen embrittlement may be produced.

When the detected temperature is lower than the target temperature in a step S303, the routine proceeds to a step S304 wherein the switching valve 21 is commanded to switch the flow direction of gas from the direction toward the fuel cell 7 to the direction toward the combustion gas discharge passage 20. Thereby deterioration of a platinum catalyst in the fuel cell 7 is prevented by stopping supply of the combustion gas including tiny amounts of CO to the fuel cell 7.

Next the routine proceeds to a step S305 wherein air and fuel are supplied to the combustor 14. In order to ensure complete combustion of the fuel, the air-fuel ratio is set to a lean value and lean combustion is performed in the combustor 14. Thereafter the routine proceeds to a step S306 wherein the flow control valves 9, 11, 13 are opened and the lean combustion gas not containing fuel is supplied to the membrane reactor 2.

In the above manner, the supply of combustion gas to the membrane reactor 2 increases the temperature of the membrane hydrogen separator 5. Thereafter the routine returns to the step S301 and the process in the steps S301–S303 is executed. When the temperature of the membrane hydrogen separator 5 is not lower than the target temperature in the step S303, that is to say, when the membrane hydrogen separator 5 can be used, the routine proceeds to a step S307. In the step S307, the first flow control valve 11, the second flow control valve 13 and the third flow control valve 9 are closed. Further, the supply of fuel and air to the combustor 14 is stopped and thus the generation of combustion gas is stopped. Thereafter in a step S308, fuel and water are supplied to the vaporizer 1, and thus fuel gas including steam and vaporized fuel is supplied to the reforming catalyst section 4 of the membrane reactor 2 in order to commence reforming reactions in the reforming catalyst section 4. Further, the valve 31 is opened to supply air to the combustion catalyst section 3 of the membrane reactor 2. Thereafter in a step S309, hydrogen which is produced and separated by the membrane reactor 2 is supplied to the fuel cell 7 by switching the switching valve 21 to the fuel cell 7. At the same time, air is supplied to the fuel cell 7 and thus the fuel cell 7 generates power as a result of the supply of air and hydrogen.

In this manner, during startup of the fuel reforming system, warming the membrane reactor 2 by using combustion gas not containing fuel prevents the hydrogen embrittlement of the membrane reactor 2.

Hereafter referring to FIG. 4, a second embodiment of this invention will be described.

Figure 4:
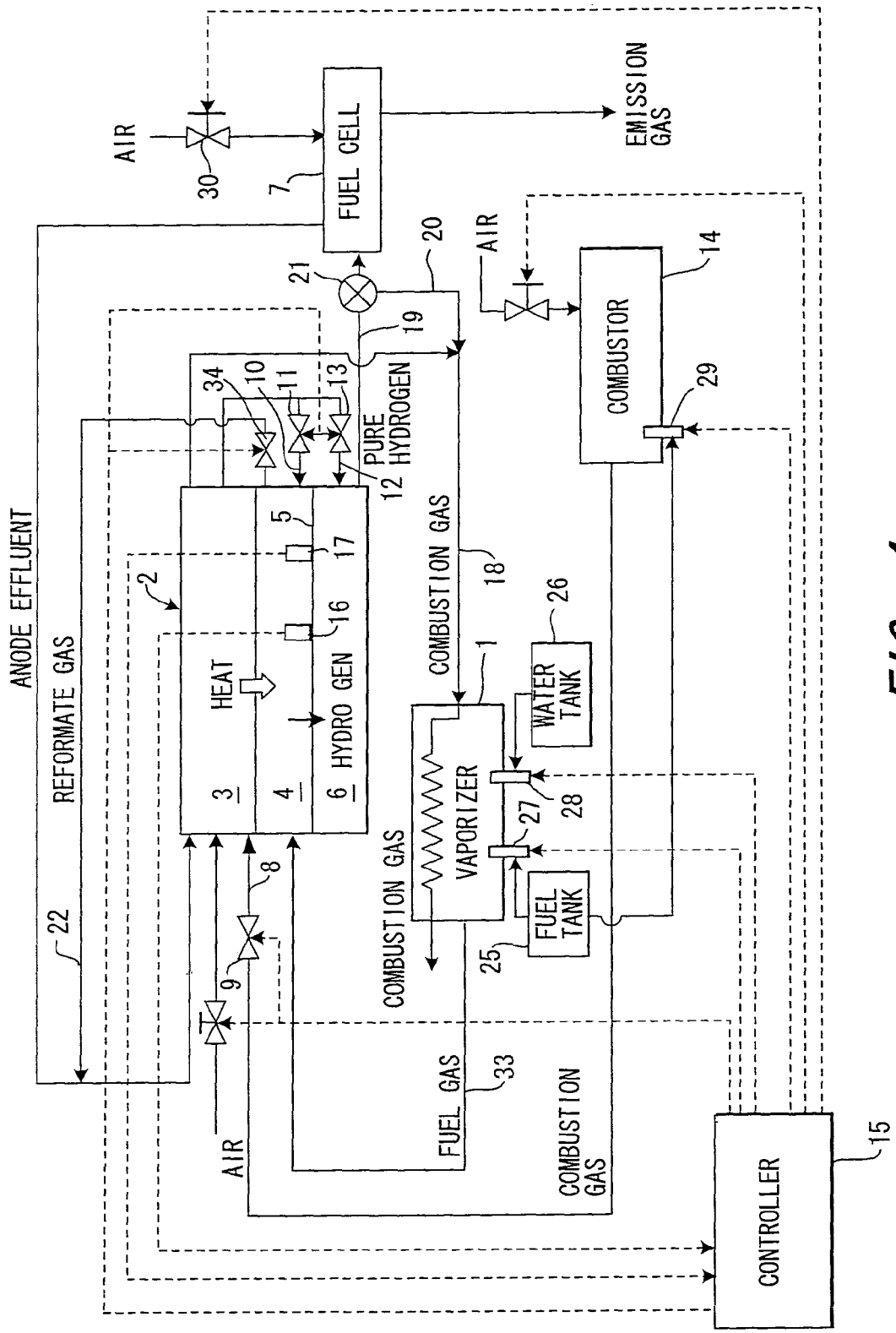
FIG. 4 shows a fuel reforming system according to a second embodiment.

In FIG. 4, those components which are the same as those in FIG. 1 are designated by the same numerals and additional description will be omitted. The point of difference with respect to the first embodiment is that in the second embodiment the combustion gas passage to the membrane reactor 2 from the combustor 14 does not branch and constitutes only the combustion gas passage 8 to the combustion catalyst section 3. The combustion gas passage extending from the combustion catalyst section 3 branches to the first combustion gas passage 10 to the reforming catalyst section 4 and the second combustion gas passage 12 to the hydrogen passage 6.

The effect of the second embodiment will be described hereafter. In this embodiment, during startup of the fuel reforming system, combustion gas produced by the combustor 14 is supplied only to the combustion catalyst section 3 of the membrane reactor 2 by passing through the third combustion gas passage 8. The combustion gas supplied in this manner is a rich combustion gas containing fuel which is burnt in the combustion catalyst section 3. A rich combustion gas containing residual uncombusted fuel is produced by enriching the air-fuel ratio with respect to air and fuel supplied to the combustor 14. Lean combustion is performed in the combustion catalyst section 3 by supplying a sufficient amount of air for burning the uncombusted fuel in the rich combustion gas to the combustion catalyst section 3, at the same time as adding the rich combustion gas. Then, lean combustion gas produced by the combustion catalyst section 3 is supplied to the hydrogen passage 6 and the reforming catalyst section 4 of the membrane reactor 2 through the first combustion gas passage 10 connected to the reforming catalyst section 4 and a second combustion gas passage 12 connecting the hydrogen passage 6.

Since the lean combustion gas supplied at this time does not contain fuel, hydrogen resulting from reformate reactions is not produced in the reforming catalyst section 4. In this manner, the temperature of the membrane hydrogen separator 5 increases rapidly as a result of supplying combustion gas to each component of the membrane reactor 2 and this results in improved startability for the system. The controller 15 monitors the pressure applied to the membrane hydrogen separator 5 and temperature of the membrane hydrogen separator 5, and further performs control for starting reformate reactions once the temperature of the membrane hydrogen separator 5 reaches a target temperature. The target temperature is set in consideration of the pressure applied to the membrane hydrogen separator 5. As the pressure becomes higher, the target temperature for the membrane hydrogen separator 5 at which reformate reactions are commenced is increased. In this manner, it is possible to ensure that hydrogen embrittlement is avoided.

Figure 5:
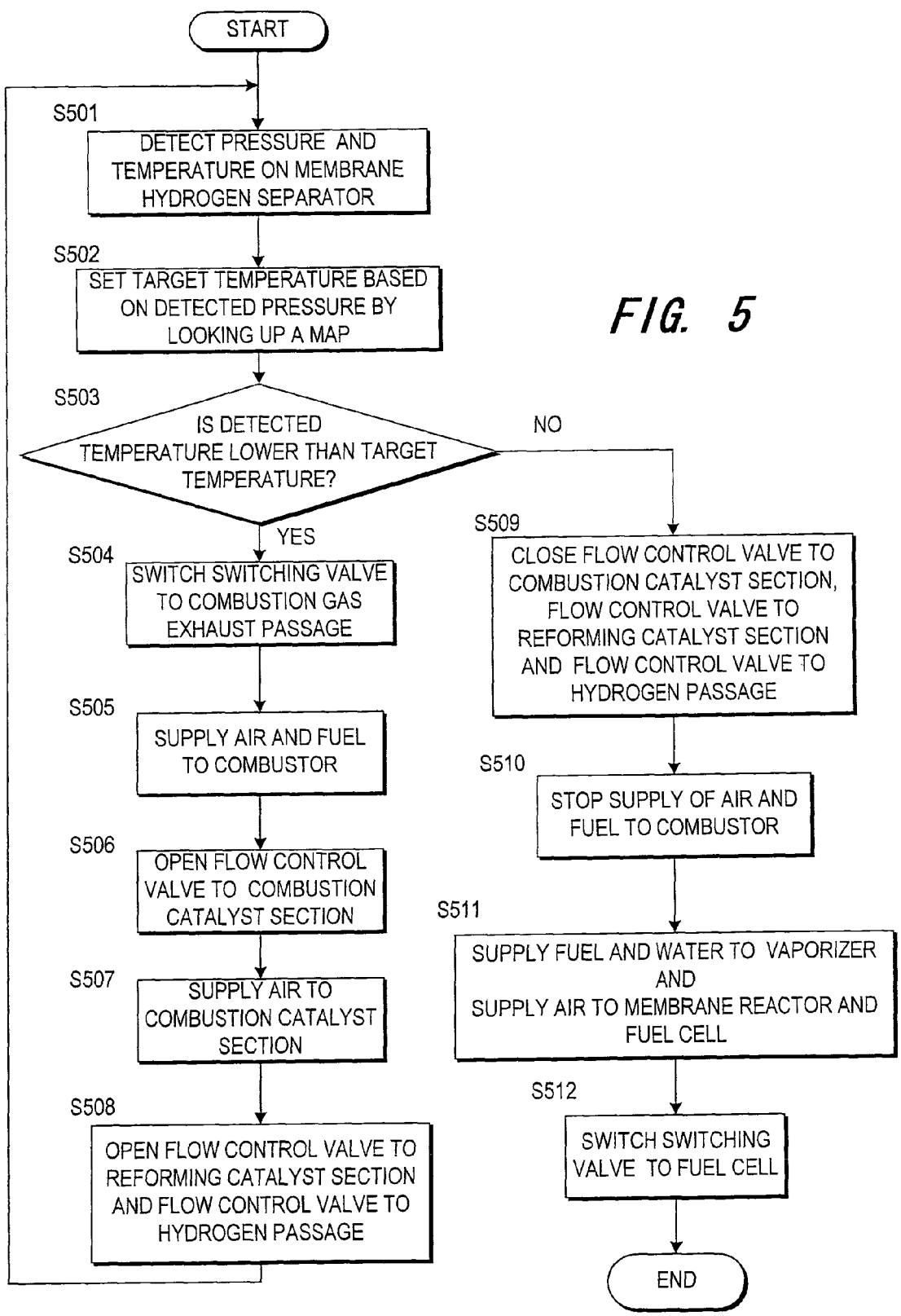
FIG. 5 is a flowchart describing a control routine according to a second embodiment.

Referring to the flowchart in FIG. 5, an exemplary control routine executed by the controller 15 for starting the fuel reforming system will be described.

In the same manner as the first embodiment, in a step S510, the pressure applied to the membrane hydrogen separator 5 and the temperature of the membrane hydrogen separator 5 is read by the controller 15 by using the temperature sensor 16 and the pressure sensor 17. The routine proceeds to a step S502 and a temperature—pressure map as shown in FIG. 2 is looked up in order to set a target temperature based on the detected pressure. In a step S503, it is determined whether or not the detected temperature is lower than the target temperature. When the determination result in the step S503 is affirmative, the routine proceeds to a step S504 wherein the switching valve 21 switches to a combustion gas exhaust passage 20. Thereafter in a step S505, the supply of air and fuel to the combustor 14 is commenced and a rich combustion gas is produced.

In a step S506, the third flow control valve 9 to the combustion catalyst section 3 is opened thereby enabling supply of a rich combustion gas to the combustion catalyst section 3. In a step S507, air is supplied to the combustion catalyst section 3 and then a high-temperature lean combustion gas is produced by the combustion catalyst section 3. Next, in a step S508, the first flow control valve 11 to the reforming catalyst section 4 and the second flow control valve 13 to the hydrogen passage 6 are opened, and thus a lean combustion gas is supplied to the reforming catalyst section 4 and the hydrogen passage 6. The supply of combustion gas to the membrane reactor 2 increases the temperature of the membrane hydrogen separator 5. Thereafter the routine returns to a step S501 and the process in the steps S501–S503 is executed. When the detected temperature is not lower than the target temperature in the step S503, the routine proceeds to a step S509 wherein all the flow control valves 9, 11, 13 are closed. Then, in a step S510, the supply of air and fuel to the combustor 14 is stopped, and thus the supply of combustion gas to the membrane reactor 2 is stopped. Thereafter in a step S511, fuel and water are supplied to the vaporizer 1 and thus vaporized fuel gas is supplied to the reforming catalyst section 4 of the membrane reactor 2. Further, supply of air to the combustion catalyst section 3 of the membrane reactor 2 and the fuel cell 7 is commenced in the step S511. In a step S512, the switching valve 21 is switched to the fuel cell 7. In this manner, hydrogen is transferred to the fuel cell 7. The fuel cell 7 commences power generation by being supplied with hydrogen and air.

As shown in the above control routine, rich combustion gas produced by the combustor 14 is supplied to the combustion catalyst section 3 and lean combustion is performed in the combustion catalyst section 3. The resulting high-temperature combustion gas not including fuel is supplied to the reforming catalyst section 4 and the hydrogen passage 6. In this manner, the temperature of the hydrogen catalyst separator 5 is effectively increased and the time required to startup the fuel reforming system is shortened.

Although the invention has been described above by reference to certain embodiments of the invention, the invention is not limited to the embodiments described above.

In the above two embodiments, a map is provided as shown in FIG. 2 to define the relationship between the target temperature at which reformate reactions are commenced and the pressure on the reforming catalyst section 4. The controller 15 sets the target temperature based on the pressure on the reforming catalyst section. However alternatively, a map may be set showing the relationship of the target temperature and the hydrogen differential pressure between the hydrogen passage 6 and the reforming catalyst section 4. In this case, the fuel reforming system may be provided with a sensor detecting gas components and the pressure in both the reforming catalyst section 4 and the hydrogen passage 6. Subsequently, the differential pressure for hydrogen may be calculated from the detection result of the sensor and the target temperature may be set based on the hydrogen differential pressure.

The control method for starting the fuel reforming system according to this invention is adapted to other fuel reforming systems using membrane hydrogen separators 5. For example, control according to this invention can be applied to system in which the reforming catalyst section 4 is provided independently from the membrane hydrogen separator 5.

In the above embodiments, combustion gas is supplied directly to the reforming catalyst section 4 in order to heat the membrane hydrogen separator 5. However the membrane hydrogen separator 5 may be heated by heat exchange.

Furthermore, in the above embodiments, during startup, the reforming system maintains the pressure on the reforming catalyst section 4 to a fixed value, and thus the pressure of the combustion gas is equal to the reformate gas. However, if the reforming system does not maintain the pressure on the reforming catalyst section 4 to a fixed value during startup, the controller 15 can also set the target temperature of the membrane hydrogen separator 5 not in response to the pressure of combustion gas but in response to the predicted partial pressure of hydrogen in the reformate gas or the predicted pressure of the reformate gas.

The entire contents of Japanese Patent Application P2001-284350 (filed Sep. 19, 2001) are incorporated herein by reference.

Modifications and variations of the embodiments described above will occur to those skilled in the art, in light of the above teachings. The scope of the invention is defined with reference to the following claims.

The invention claimed is:

1. A fuel reforming system comprising:
a membrane reactor (2) having a reforming catalyst section (4) for reforming a supplied fuel gas to a reformate gas; a membrane hydrogen separator (5) for separating hydrogen from the reformate gas; a hydrogen passage (6) for transferring hydrogen separated by the membrane hydrogen separator to a fuel cell (7); and a combustion catalyst section (3) for heating the reforming catalyst section;
a first supply device (8,9,10,11,12,13,14,25,29) for supplying combustion gas to the membrane reactor, the first supply device having a combustor (14) for producing the combustion gas;
a second supply device (1,25,26,27,28,33) for supplying the fuel gas to the reforming catalyst section;
a sensor (16) for detecting a temperature of the membrane hydrogen separator; and
a controller (15) functioning to:
determine whether or not the temperature of the membrane hydrogen separator (5) is greater than or equal to a target temperature before the reforming catalyst section starts reformate reactions on the fuel gas;
command the first supply device to supply the combustion gas to at least one of the reforming catalyst section and hydrogen passage when the temperature of the membrane hydrogen separator is smaller than the target temperature; and
command the first supply device to stop the supply of the combustion gas and command the second supply device to start supply of the fuel gas to the reforming catalyst section of the membrane reactor when the temperature of the membrane hydrogen separator reaches the target temperature.

2. The fuel reforming system as defined in claim 1, wherein the first supply device comprises a first passage (10) for transferring the combustion gas from the combustor to the reforming catalyst section and a first valve (11) provided in the first passage in order to regulate a flow rate of the combustion gas in response to a command from the controller (15); and wherein the controller (15) further functions to command the first valve (11) to allow flow of the combustion gas when the temperature of the membrane hydrogen separator is smaller than the target temperature.

3. The fuel reforming system as defined in claim 1, wherein the first supply device comprises a second passage (12) for transferring the combustion gas from the combustor to the hydrogen passage and a second valve (13) provided in the second passage in order to regulate a flow rate of the combustion gas in response to a command from the controller (15); and wherein the controller (15) further functions to command the second valve to allow flow of the combustion gas when the temperature of the membrane hydrogen separator is smaller than the target temperature.

4. The fuel reforming system as defined in claim 1, wherein the first supply device comprises a third passage (8) for transferring the combustion gas from the combustor to the combustion catalyst section and a third valve (9) provided in the third passage in order to regulate a flow rate of the combustion gas in response to a command from the controller (15); and wherein the controller (15) further functions to command the third valve to allow flow of the combustion gas when the temperature of the membrane hydrogen separator is smaller than the target temperature.

5. The fuel reforming system as defined in claim 1, wherein the combustor (14) in the first supply device produces a lean combustion gas not containing fuel.

6. The fuel reforming system as defined in claim 1, wherein the combustion gas produced by the combustor (14) contains fuel;

and wherein the first supply device comprises a first passage (10) for transferring the combustion gas from the combustion catalyst section (3) to the reforming catalyst section (4), the first passage being provided with a first valve for regulating a flow rate of the combustion gas in response to a command from the controller (15), and a third passage (8) transferring the combustion gas from the combustor (14) to the combustion catalyst section (3), the third passage being provided with a third valve provided for regulating a flow rate of the combustion gas in response to a command from the controller (15); wherein the combustion catalyst section (3) burns the fuel contained in the combustion gas;

and wherein the controller (15) further functions to command the first and third valves (9,11) to allow flow of the combustion gas when the temperature of the membrane hydrogen separator (5) is smaller than the target temperature.

7. The fuel reforming system as defined in claim 1, wherein the combustion gas produced by the combustor contains fuel;

and wherein the first supply device comprises a second passage (12) transferring the combustion gas from the combustion catalyst section (3) to the hydrogen passage (6), the second passage being provided with a second valve (13) for regulating a flow rate of the combustion gas in response to a command from the controller (15), and a third passage (8) transferring the combustion gas from the combustor (14) to the combustion catalyst section (3), the third passage being provided with a third valve (9) provided in the third passage for regulating the flow rate of the combustion gas in response to a command from the controller (15); wherein the combustion catalyst section (3) burns the fuel in the combustion gas;

and wherein the controller (15) further functions to command the second and third valves to allow flow of combustion gas when the temperature of the membrane hydrogen separator (5) is smaller than the target temperature.

8. The fuel reforming system as defined in claim 1, wherein the first supply device supplies the combustion gas to the hydrogen passage (6), the reforming catalyst section (4) and the combustion catalyst section (3) so that the flow rate to the hydrogen passage, the reforming catalyst section and the combustion catalyst section is substantially equal.

9. The fuel reforming system as defined in claim 8, wherein the first supply device comprises a first valve (11) for regulating a flow rate of the combustion gas to the reforming catalyst section (4) in response to a command from the controller (15), a second valve (13) for regulating a flow rate of the combustion gas to the hydrogen passage (6) in response to a command from the controller (15), and a third valve (9) for regulating a flow rate of the combustion gas to the combustion catalyst section (3) in response to a command from the controller;

and wherein the controller (15) controls the first, second and third valves so that the flow rate to the hydrogen passage, the reforming catalyst section and the combustion catalyst section is substantially equal.

10. The fuel reforming system as defined in claim 8 wherein the cross-sectional area of a passage (12) transferring the combustion gas to the hydrogen passage (6) is smaller than the cross-sectional area of a passage (10) transferring the combustion gas to the reforming catalyst section (4) and the cross-sectional area of a passage (8) transferring the combustion gas to the combustion catalyst section (3).

11. The fuel reforming system as defined in claim 1, further comprising a sensor (17) for detecting a pressure applied to the membrane hydrogen separator (5);

wherein the controller (15) further sets the target temperature for the membrane hydrogen separator in response to the pressure applied to the membrane hydrogen separator so that the target temperature increases as the pressure increases.

12. A startup controlling method for use in a fuel reforming system; the fuel reforming system comprising: a membrane reactor (2) having a reforming catalyst section (4) for reforming a supplied fuel gas to a reformate gas, a membrane hydrogen separator (5) for separating hydrogen from the reformate gas, a hydrogen passage (6) for transferring hydrogen separated by the membrane hydrogen separator to a fuel cell (7), and a combustion catalyst section (3) for heating the reforming catalyst section; a first supply device (8,9,10,11,12,13,14,25,29) for supplying combustion gas to the membrane reactor, the first supply device having a combustor (14) for producing the combustion gas; a second supply device (1,25,26,27,28,33) for supplying the fuel gas to the reforming catalyst section; a sensor (16) for detecting a temperature of the membrane hydrogen separator;

the method comprising:

determining whether or not the temperature of the membrane hydrogen separator (5) is greater than or equal to a target temperature before the reforming catalyst section starts reformate reactions on the fuel gas;

commanding the first supply device to supply the combustion gas to at least one of the reforming catalyst section and hydrogen passage when the temperature of the membrane hydrogen separator is smaller than the target temperature; and commanding the first supply device to stop the supply of the combustion gas and commanding the second supply device to start supply of the fuel gas to the reforming catalyst section of the membrane reactor when the temperature of the membrane hydrogen separator reaches the target temperature.

13. A fuel reforming system comprising:

a membrane reactor having a reforming catalyst section for reforming a supplied fuel gas to a reformate gas; a membrane hydrogen separator for separating hydrogen from the reformate gas; a hydrogen passage for transferring hydrogen separated by the membrane hydrogen separator to a fuel cell; and a combustion catalyst section for heating the reforming catalyst section;

a first supply device for supplying combustion gas to the membrane reactor, the first supply device having a combustor for producing the combustion gas;

a second supply device for supplying the fuel gas to the reforming catalyst section;

a sensor for detecting a temperature of the membrane hydrogen separator;

means for determining whether or not the temperature of the membrane hydrogen separator is greater than or equal to a target temperature before the reforming catalyst section starts reformate reactions on the fuel gas;

means for command the first supply device to supply the combustion gas to at least one of the reforming catalyst section and hydrogen passage when the temperature of the membrane hydrogen separator is smaller than the target temperature; and means for commanding the first supply device to stop the supply of the combustion gas and commanding the second supply device to start supply of the fuel gas to the reforming catalyst section of the membrane reactor when the temperature of the membrane hydrogen separator reaches the target temperature.

* * * * *